No. 742,603. PATENTED OCT. 27, 1903.
J. CZAPIKOWSKI.
APPARATUS FOR MIXING SUGAR.
APPLICATION FILED FEB. 16, 1903.
NO MODEL.

Witnesses.

Inventor.
Jan Czapikowski
by B. Singer
Att'y.

No. 742,603.

Patented October 27, 1903.

UNITED STATES PATENT OFFICE.

JAN CZAPIKOWSKI, OF DEREBCZYN, NEAR RACHNY, RUSSIA.

APPARATUS FOR MIXING SUGAR.

SPECIFICATION forming part of Letters Patent No. 742,603, dated October 27, 1903.

Application filed February 16, 1903. Serial No. 143,682. (No model.)

*To all whom it may concern:*

Be it known that I, JAN CZAPIKOWSKI, a subject of the Russian Emperor, residing at Derebczyn, near Rachny, Government of Podolsk, Russia, have invented a new and useful Apparatus for Mixing Sugar, of which the following is a specification.

This invention relates to a mixing apparatus especially adapted for crystallizing sugar-juices and the like, which not only have to be thoroughly mixed, but must also be cooled or heated or alternately cooled and heated equally throughout the whole mass. I attain these objects by means of the apparatus shown in the accompanying drawings, in which—

Figure 1:
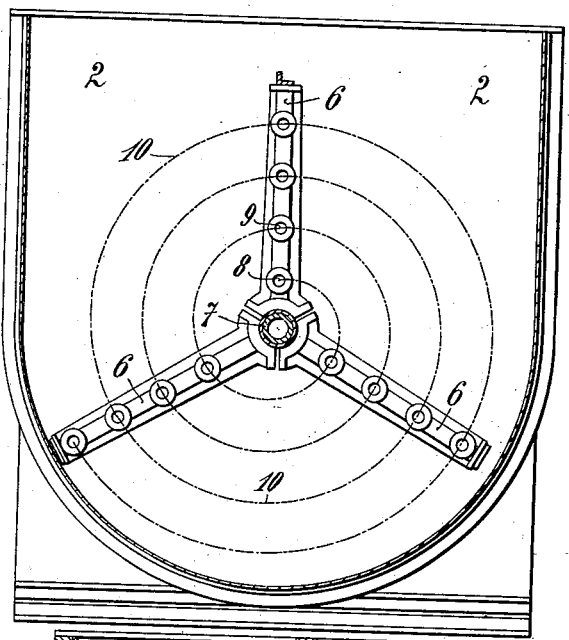
Figure 2:
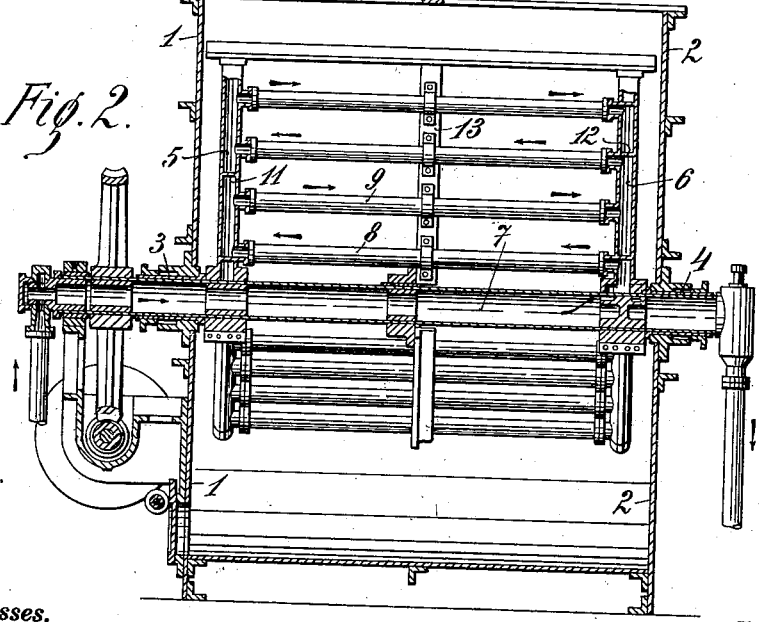

Figure 1 is a vertical cross-section of an apparatus embodying this invention. Fig. 2 is a vertical longitudinal section of the same.

1 and 2 represent the ends of a suitable vessel adapted to receive the liquid to be treated. In this vessel is a tubular mixer with hollow gudgeons 3 and 4, having their bearings in the walls 1 and 2 of the vessel. These bearings are provided with any suitable stuffing-boxes. A central tube 7, secured in the gudgeons 3 and 4, is rotated by any well-known device externally of the vessel. This tube has radial hollow arms 5 and 6 adjacent to the ends of the vessel. Communicating between these arms are horizontal tubes 8 9, which are arranged in a spiral with reference to the central tube 7, as indicated by the curve in the cross-section, Fig. 1. These tubes may be braced by supports 13, Fig. 2. The arms 5 and 6 are divided into chambers by transverse walls 11 and 12, so that the fluid in passing through the mixing device will be given a certain course. As indicated by the arrows in Fig. 2, the heating or cooling fluid enters at one end of the tube 7, flows through the tube to the arm 6, then back through the tube 8 into a chamber of the arm 5, from there back through tube 9 to a second chamber in the arm 6, and so on until it reaches the outer tube, from whence it flows through the gudgeon 4 to the discharge.

In consequence of the arrangement of the pipes and the cause of the heating or cooling fluid passed therethrough it is readily seen that as the mixer is turned the heating or cooling will be performed uniformly throughout the whole mass of the material being treated in the vessel.

In the manufacture of refined sugar, for instance, the operation of this apparatus is particularly noticeable. The liquid mass is conducted directly from the vacuum-boiler into the mixing vessel. Here the mass is continually mixed and is cooled to a temperature of about 77° Fahrenheit, (25° centigrade.) Then the cooling is stopped, but not the mixing. This is continued as long as the crystals are forming. By this operation the mass becomes nearly solid and must be melted into a liquid condition without the addition of water. This is accomplished by continuing the turning of the mixer and introducing steam through the pipes. The mass of fine sugar-crystals will be gradually mixed and heated to about 113° Fahrenheit, (45° centigrade,) when it becomes liquid and can be conducted away by gravity or pumping.

What I claim, and desire to secure by Letters Patent, is—

In a mixing apparatus the combination of a revoluble central tube, bearings in said vessel for said tube, arms extending from said tube having chambers therein, tubes connecting said chambers and arranged spirally with relation to said central tube, said tubes and chambers being so arranged that the fluid passed therethrough will enter through the central tube pass into a radial chamber, then through a longitudinal tube and so continue until reaching the outer longitudinal tube from whence it is discharged through one of said arms and out through one of the gudgeons substantially as described.

In testimony whereof I affix my signature in presence of two witnesses.

JAN CZAPIKOWSKI.

Witnesses:
THOMAS MILES,
THOMAS E. HEENAN.